United States Patent
Farschi

(10) Patent No.: US 11,627,727 B2
(45) Date of Patent: Apr. 18, 2023

(54) INCUBATOR

(71) Applicant: OVO INCUBATORS (PTY) LTD, Johannesburg (ZA)

(72) Inventor: Amir Farschi, Johannesburg (ZA)

(73) Assignee: Ovo Incubators (Pty) Ltd, Johannesburg (ZA)

( * ) Notice: Subject to any disclaimer, the term of this patent is extended or adjusted under 35 U.S.C. 154(b) by 0 days.

(21) Appl. No.: 17/773,716

(22) PCT Filed: Nov. 25, 2020

(86) PCT No.: PCT/ZA2020/050067
§ 371 (c)(1),
(2) Date: May 2, 2022

(87) PCT Pub. No.: WO2021/108818
PCT Pub. Date: Jun. 3, 2021

(65) Prior Publication Data
US 2022/0361458 A1 Nov. 17, 2022

(30) Foreign Application Priority Data
Nov. 26, 2019 (ZA) .................................. 201907813

(51) Int. Cl.
*A01K 41/02* (2006.01)
*A01K 41/06* (2006.01)

(52) U.S. Cl.
CPC .......... *A01K 41/065* (2013.01); *A01K 41/023* (2013.01)

(58) Field of Classification Search
CPC ...... A01K 41/02; A01K 41/023; A01K 41/04; A01K 41/065

(Continued)

(56) References Cited

U.S. PATENT DOCUMENTS

| 1,262,860 A | 4/1918 | Smith |
| 2,352,398 A | 6/1944 | Markey |

(Continued)

FOREIGN PATENT DOCUMENTS

| CN | 200947773 | 9/2007 |
| CN | 203261994 | 11/2013 |

(Continued)

OTHER PUBLICATIONS

International Search Report and Written Opinion issued by the World Intellectual Property Office in International Application No. PCT/ZA2020/050067.

*Primary Examiner* — David J Parsley
(74) *Attorney, Agent, or Firm* — Billion & Armitage

(57) ABSTRACT

An incubator includes a housing defining a chamber, an air inlet for introducing air into the chamber, and a first air outlet for discharging air from the chamber. The first air outlet is spaced from the air inlet, and a stack of operatively vertically spaced first trays is disposed within the chamber between the air inlet and the first air outlet. A first tilting mechanism is provided for tilting the stack of first trays on a plane substantially perpendicular to the direction of operative airflow from the air inlet to the first air outlet. A stack of operatively vertically spaced first deflectors are disposed operatively upstream of the first trays for dividing the airflow from the air inlet to the first air outlet into streams of airflow directed over the first trays. The incubator further includes a second tilting mechanism for tilting the first deflectors on a plane substantially perpendicular to the direction of operative airflow from the air inlet to the first air outlet to align the first deflectors with the first trays.

22 Claims, 8 Drawing Sheets

(58) Field of Classification Search
USPC .................. 119/315, 318, 319, 322, 328
See application file for complete search history.

(56) References Cited

U.S. PATENT DOCUMENTS

| | | | |
|---|---|---|---|
| 3,396,703 A | | 8/1968 | Trussell |
| 3,556,731 A | | 1/1971 | Martin |
| 3,938,472 A | * | 2/1976 | Jauneaud ............... A01K 41/00 119/319 |
| 4,195,131 A | | 3/1980 | Papas |
| 4,256,697 A | | 3/1981 | Baldwin |
| 4,501,719 A | | 2/1985 | Williams |
| 4,606,299 A | * | 8/1986 | Grumbach ............ A01K 41/04 119/314 |
| 4,735,778 A | | 4/1988 | Maruyama et al. |
| 4,824,791 A | | 4/1989 | Ekholm et al. |
| 4,950,608 A | | 8/1990 | Kishimoto |
| 5,410,985 A | | 5/1995 | Schritz |
| 5,435,378 A | | 7/1995 | Heine et al. |
| 5,475,610 A | | 12/1995 | Atwood et al. |
| 5,484,015 A | | 1/1996 | Kyees |
| 5,504,007 A | | 4/1996 | Haynes |
| 5,789,007 A | | 8/1998 | Bianco |
| 6,012,384 A | | 1/2000 | Badalament et al. |
| 6,558,947 B1 | | 5/2003 | Lund et al. |
| 6,708,755 B1 | | 3/2004 | Meter |
| 7,861,673 B2 | | 1/2011 | Huisinga et al. |
| 7,966,972 B2 | * | 6/2011 | Meter ................... A01K 41/06 119/300 |
| 2005/0015920 A1 | | 1/2005 | Kim et al. |
| 2006/0199261 A1 | | 9/2006 | Malmqvist et al. |
| 2011/0203787 A1 | | 8/2011 | Meter |
| 2014/0273182 A1 | | 9/2014 | Tan et al. |
| 2015/0352553 A1 | | 12/2015 | Beer et al. |

FOREIGN PATENT DOCUMENTS

| | | |
|---|---|---|
| CN | 103478016 | 1/2014 |
| EP | 1266691 | 12/2002 |
| EP | 1993351 | 11/2008 |
| GB | 335483 | 9/1930 |
| GB | 1470232 | 4/1977 |
| GB | 2263053 | 7/1993 |
| WO | 0125866 | 4/2001 |
| WO | 2005097325 | 10/2005 |

* cited by examiner

INCUBATOR

BACKGROUND

The present invention relates to an incubator. More specifically, the present invention relates to an egg incubator, wherein eggs are supported on tiltable trays. Even more specifically, the present invention relates to an egg incubator including an air inlet and air outlet, wherein tiltable deflectors are associated with the air inlet, to facilitate airflow over the tiltable trays.

Various incubators are known. For instance:

GB1,470,232 "Improvements in or relating to the hatching of eggs", CN103478016, U.S. Pat. No. 1,262,860 "Incubator" and U.S. Pat. No. 5,410,985 "Poultry incubator and method" describe an egg incubator including: a housing containing a stack of egg-supporting trays; and a fan for circulating air within the housing.

NL1,026,448 describes an egg incubator including: a housing; an air inlet; an air outlet spaced from the air inlet for circulating air within the housing; and a series of cages for containing animals (e.g. chickens) disposed between the air inlet and outlet. A similar system including egg/produce-supporting trays instead of cages is described in U.S. Pat. No. 3,396,703 "Poultry hatching apparatus", U.S. Pat. No. 5,789,007 "Method and apparatus for controlled ripening of fresh produce", U.S. Pat. No. 6,012,384 "Mobile ripening container", U.S. Pat. No. 6,708,755 "Method for controlling the temperature in a climate chamber and climatic device", U.S. Pat. No. 7,861,673 "Egg incubation transport system and methods regarding same", GB2,263,053 "Walk-in incubator" and US2011/0203787 "Method for regulating the temperature of a climate chamber and a climate chamber". Various of these prior art systems include high and low pressure plena associated with the air inlet and air outlet, respectively, to facilitate equal distribution of airflow across the cages and trays.

US2011/0203787, U.S. Pat. Nos. 1,262,860 and 6,708,755 further describe tilted egg-supporting trays.

It is also known for incubator trays to be hollow and for temperature-controlled fluid to circulate within the trays to maintain material supported on the trays at a constant temperature. Such trays are described in EP1,266,691 "Temperature-controlled device and method suitable for spectroscopic analysis", WO01/25866 "A system for controlling laboratory sample temperature and a thermal tray for use in such system", WO2005/097325 "Autonomous device with active temperature regulation", U.S. Pat. No. 3,556,731 "Automated incubation apparatus", U.S. Pat. No. 4,195,131 "Environmentally controlled unit", U.S. Pat. No. 4,256,697 "Blood incubator device", U.S. Pat. No. 4,501,719 "Tray apparatus for freeze-drying biologicals having a predetermined unit dosage", U.S. Pat. No. 4,735,778 "Microtiter plate", U.S. Pat. No. 4,824,791 "Thermostated cuvette set", U.S. Pat. No. 4,950,608 "Temperature regulating container", U.S. Pat. No. 5,435,378 "Apparatus for accurately heating and cooling articles", U.S. Pat. No. 5,475,610 "Thermal cycler for automatic performance of the polymerase chain reaction with close temperature control", U.S. Pat. No. 5,484,015 "Cold plate and method of making same", U.S. Pat. No. 5,504,007 "Rapid thermal cycle apparatus", U.S. Pat. No. 6,558,947 "Thermal cycler", US2006/0199261 "Holder and method for cooling or heating samples", US2014/0273182 "Device for carrying out chemical or biological reactions" and US2015/0352553 "Methods and compositions for rapid thermal cycling". However, these prior art hollow trays have not been used within egg incubator chambers.

A drawback of known egg incubators is that the sides of the trays proximal the air inlet induces turbulence in air flowing over the trays, which turbulence results in small variations in the temperature of eggs supported on the trays.

It is an object of the present invention to provide an incubator that directs airflow from the air inlet away from the tray sides proximal the air inlet, thereby: to reduce air turbulence induced by such tray sides; and to address variance in temperature of eggs supported on the tray.

SUMMARY OF THE INVENTION

According to a preferred embodiment of the invention, there is provided an incubator that includes:
a housing defining a chamber;
an air inlet for introducing air into the chamber;
a first air outlet for discharging air from the chamber, the first air outlet being spaced from the air inlet;
a stack of operatively vertically spaced first trays disposed within the chamber, between the air inlet and the first air outlet; and
a first means for tilting the stack of first trays on a plane substantially perpendicular to the direction of operative airflow from the air inlet to the first air outlet;
characterised in that:
a stack of operatively vertically spaced first deflectors are disposed operatively upstream of the first trays for, in use, dividing the airflow from the air inlet to the first air outlet into streams of airflow directed over the first trays; and
the incubator further includes a second means for tilting the first deflectors on a plane substantially perpendicular to the direction of operative airflow from the air inlet to the first air outlet, in use, to align the first deflectors with the first trays.

Typically, the first tilting means is coupled to the second tilting means to synchronise tilting of the first deflectors with tilting of the first trays.

Generally, each first deflector is generally V-shaped, tapering:
from a first end proximal a first tray with which the first deflector is associated, which first end of the taper is sized and shaped to correspond to the inlet-facing side of the associated first tray;
towards the air inlet.

Preferably, each first deflector further defines a generally cuboid portion that extends from the first end of the first deflector towards a first tray with which the first deflector is associated.

Typically, the second tilting means includes a rocker to which the first deflectors are connected.

Generally, the air inlet is disposed centrally within the chamber, flanked on a first side by the first air outlet and on an opposite second side by a second air outlet. Alternatively, the air outlet may be disposed centrally within the chamber, flanked on a first side by the first air inlet and on an opposite second side by a second air inlet.

Preferably, the incubator further includes:
a stack of operatively vertically spaced second trays disposed within the chamber, between the air inlet and the second air outlet;

a third means for tilting the stack of second trays on a plane substantially perpendicular to the direction of operative airflow from the air inlet to the second air outlet;

a stack of operatively vertically spaced second deflectors disposed operatively upstream of the second trays for, in use, dividing the airflow from the air inlet to the second air outlet into streams of airflow directed over the second trays;

a fourth means for tilting the second deflectors on a plane substantially perpendicular to the direction of operative airflow from the aft inlet to the second air outlet, in use to align the second deflectors with the first trays, and wherein the third tilting means is coupled to the fourth tilting means to synchronise tilting of the second deflectors with tilting of the second trays;

a first conduit extending: from the first air outlet and the second air outlet on the one hand; to the air inlet on the other hand;

a pump for conducting air from the first and second air outlets to the air inlet; and a filter disposed within the conduit or, in use, filtering air conducted along the conduit.

Typically, the first, second, third and fourth means for tilting are, in use, operable to tilt the first trays, the first deflectors, the second trays and the second deflectors, respectively, by between 38 degrees and 45 degrees on either side of the operative horizontal.

Generally, each second deflector is generally V-shaped, tapering:
from a first end proximal a second tray with which the second deflector is associated, which first end of the taper is sized and shaped to correspond to the inlet-facing side of the associated second tray;
towards the air inlet.

Preferably, each second deflector further defines a generally cuboid portion that extends from the first end of the second deflector towards a second tray with which the second deflector is associated.

Typically, the air inlet includes a plenum with: a first diffuser for introducing air into the chamber along the height and along the length of the stack of first trays; and a second diffuser for introducing air along the height and along the length of the stack of second trays.

Generally:
the first outlet includes a plenum with a third diffuser for extracting air from the chamber along the height and along the length of the stack of first trays; and
the second outlet includes a plenum with a fourth diffuser for extracting air from the chamber along the height and along the length of the stack of second trays.

Preferably, each of the first, second, third and fourth diffusers comprises a sheet defining a plurality of apertures.

Typically, the apertures defined by each of the third and fourth diffusers are larger than the apertures defined by the first and second diffusers.

Generally, in respect of each of the first, second, third and fourth diffusers, the apertures defined thereby increase in size from the operative upper end of the diffuser to the operative lower end of the diffuser.

Preferably, each of the first and second trays:
defines a stack of receptacles for, in use, receiving an egg within each receptacle; and
is hollow.

Typically, the incubator further includes means for reticulating fluid within the first and second trays, in use, to control temperature of the first and second trays.

Generally, the incubator further includes:
a secondary heating/cooling means for regulating temperature of air within the air inlet; and
a primary heating/cooling means for regulating temperature of fluid reticulated within the first and second trays.

Preferably: the interior of each of the first trays is in fluid communication with the interior of each of the other first trays; and the interior of each of the second trays is in fluid communication with the interior of each of the other second trays.

Typically: the stack of first trays are supported on a first trolley; and the stack of second trays are supported on a second trolley.

Generally, the first deflector is disposed:
between the first diffuser and the first tray; or
operatively upstream of the first diffuser; and
the second deflector is disposed:
between the second diffuser and the second tray; or
operatively upstream of the second diffuser.

Preferably, the apertures defined by each of the first, second, third and fourth diffusers are octagonal in shape.

BRIEF DESCRIPTION OF THE DRAWINGS

The invention will now be described in more detail, by way of example only, with reference to the accompanying drawings in which.

DESCRIPTION OF THE INVENTION

Figure 1:
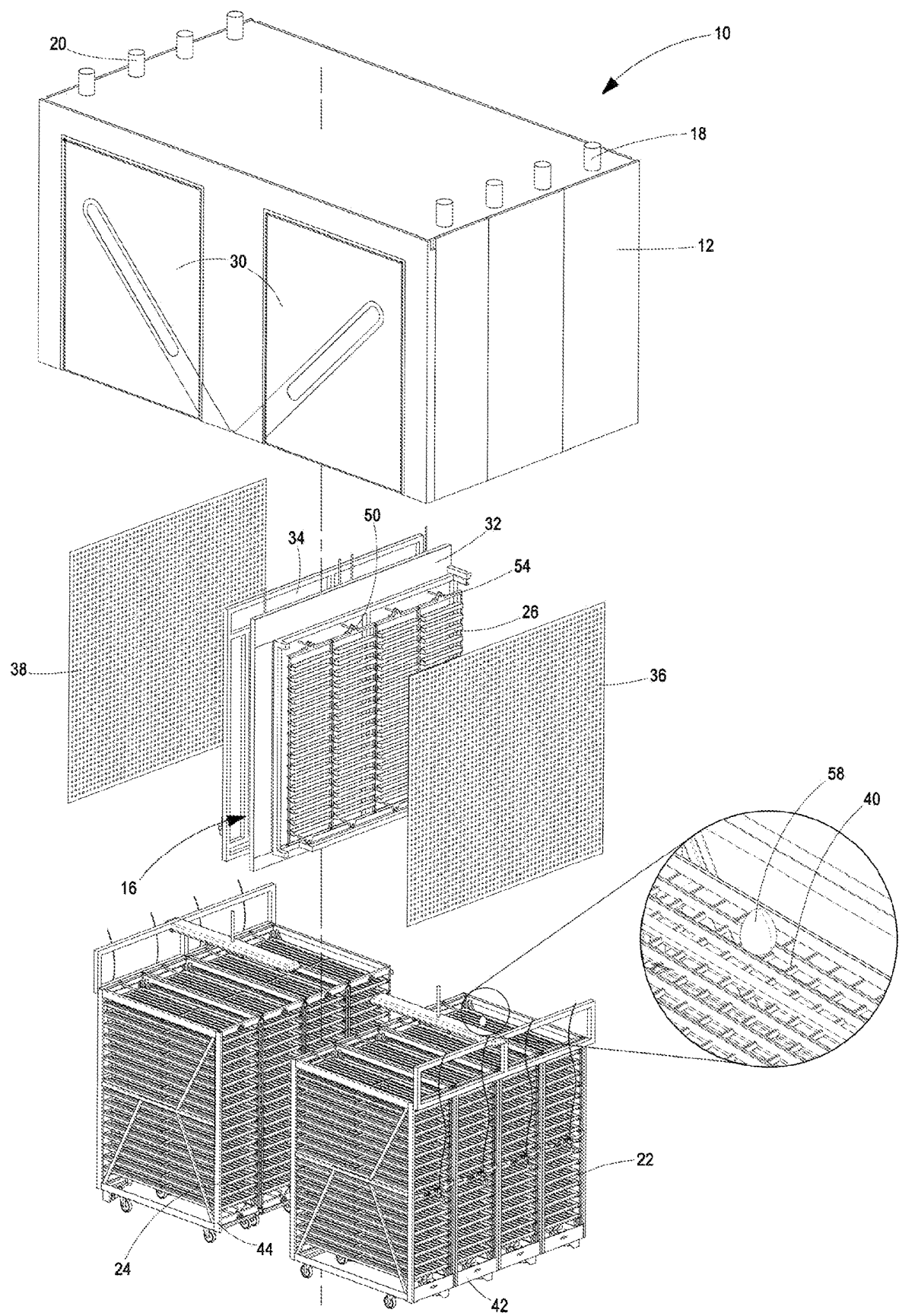
FIG. 1 is a perspective partially exploded view of an incubator according to a preferred embodiment of the invention.
Figure 2:
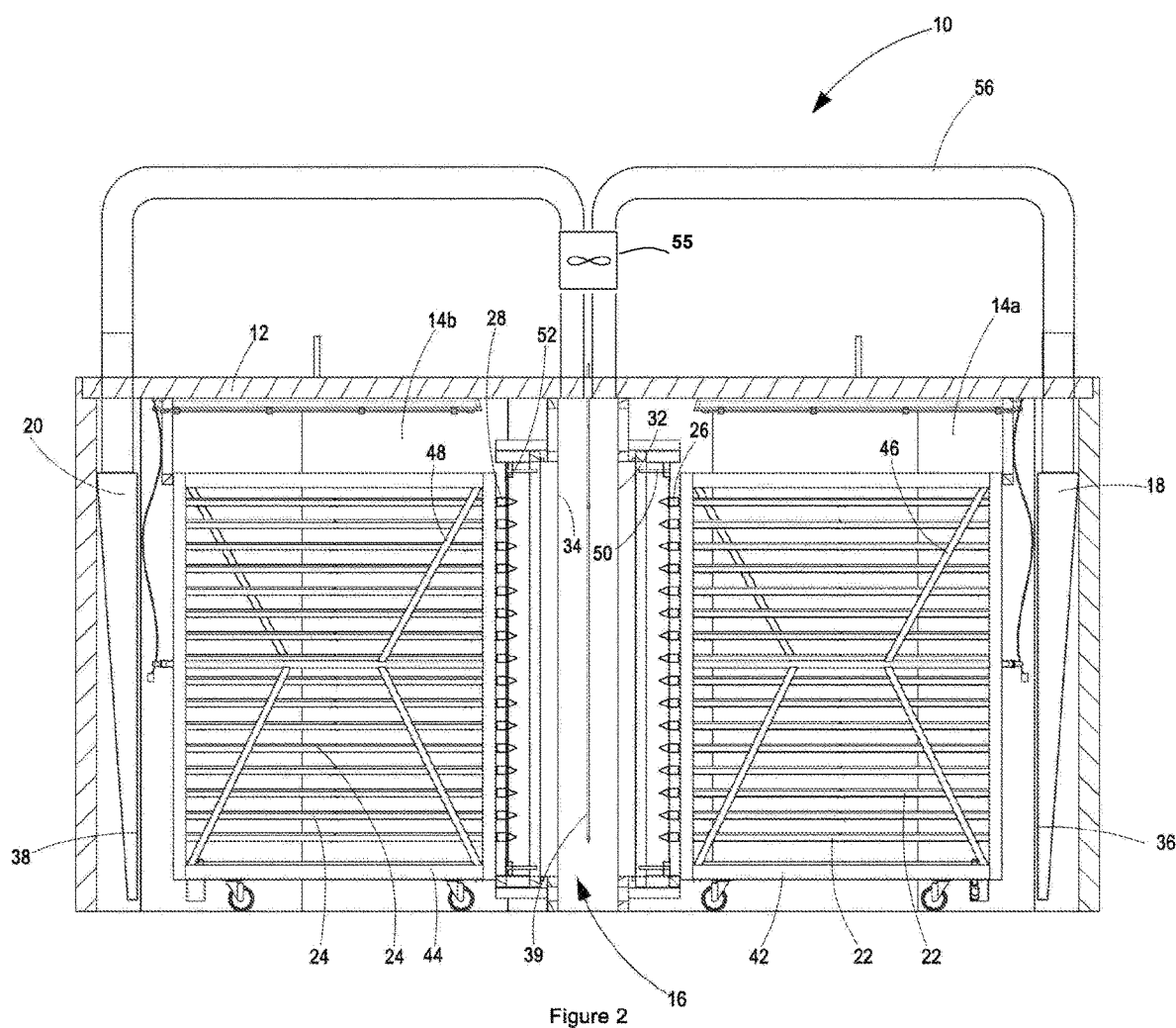
FIG. 2 is a cross-sectional side view of the incubator in FIG. 1.
Figure 3:
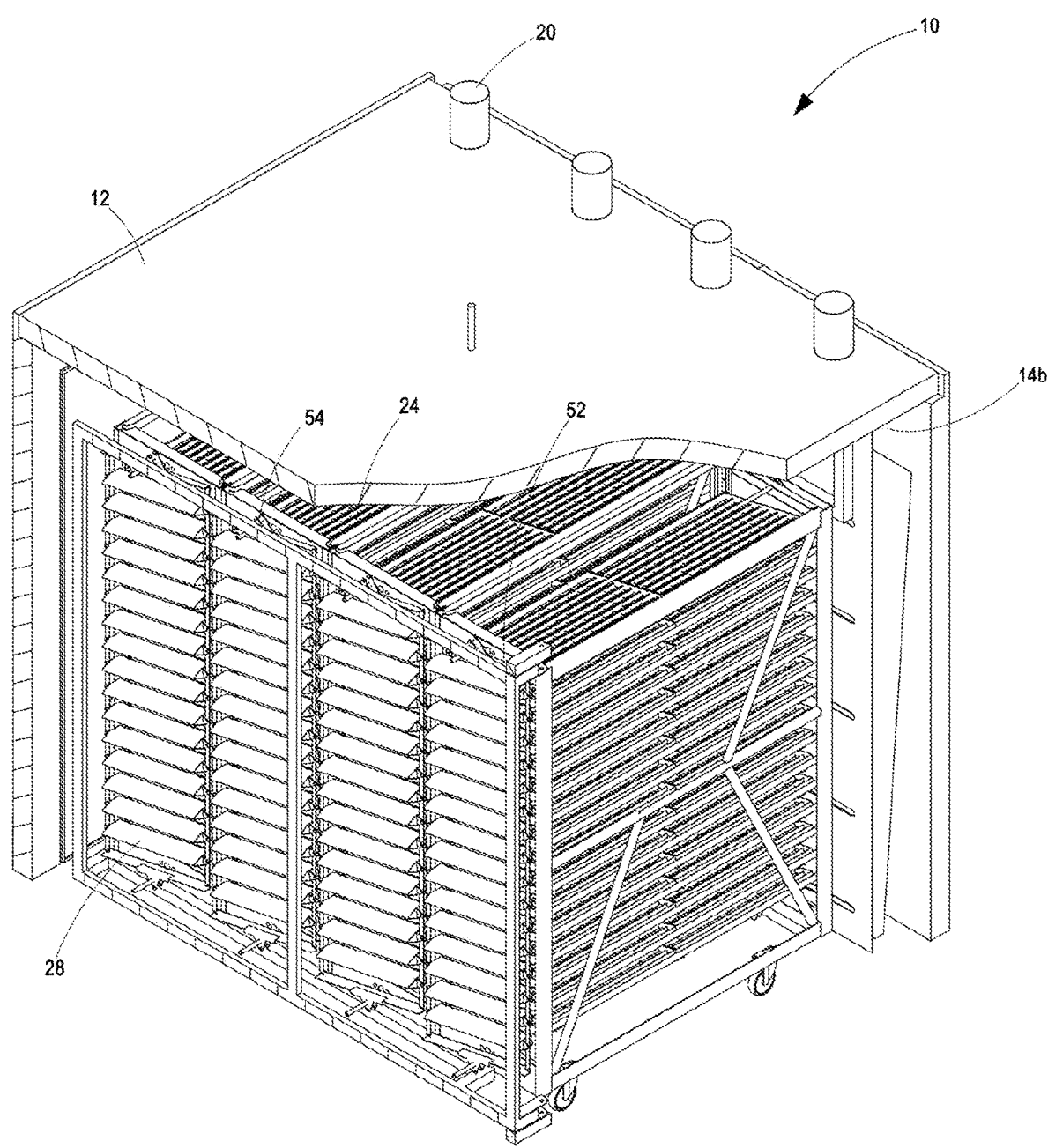
FIG. 3 is a partially cut-away cross-sectional perspective view of the incubator in FIG. 1, with trays tilted in a first direction.
Figure 4:
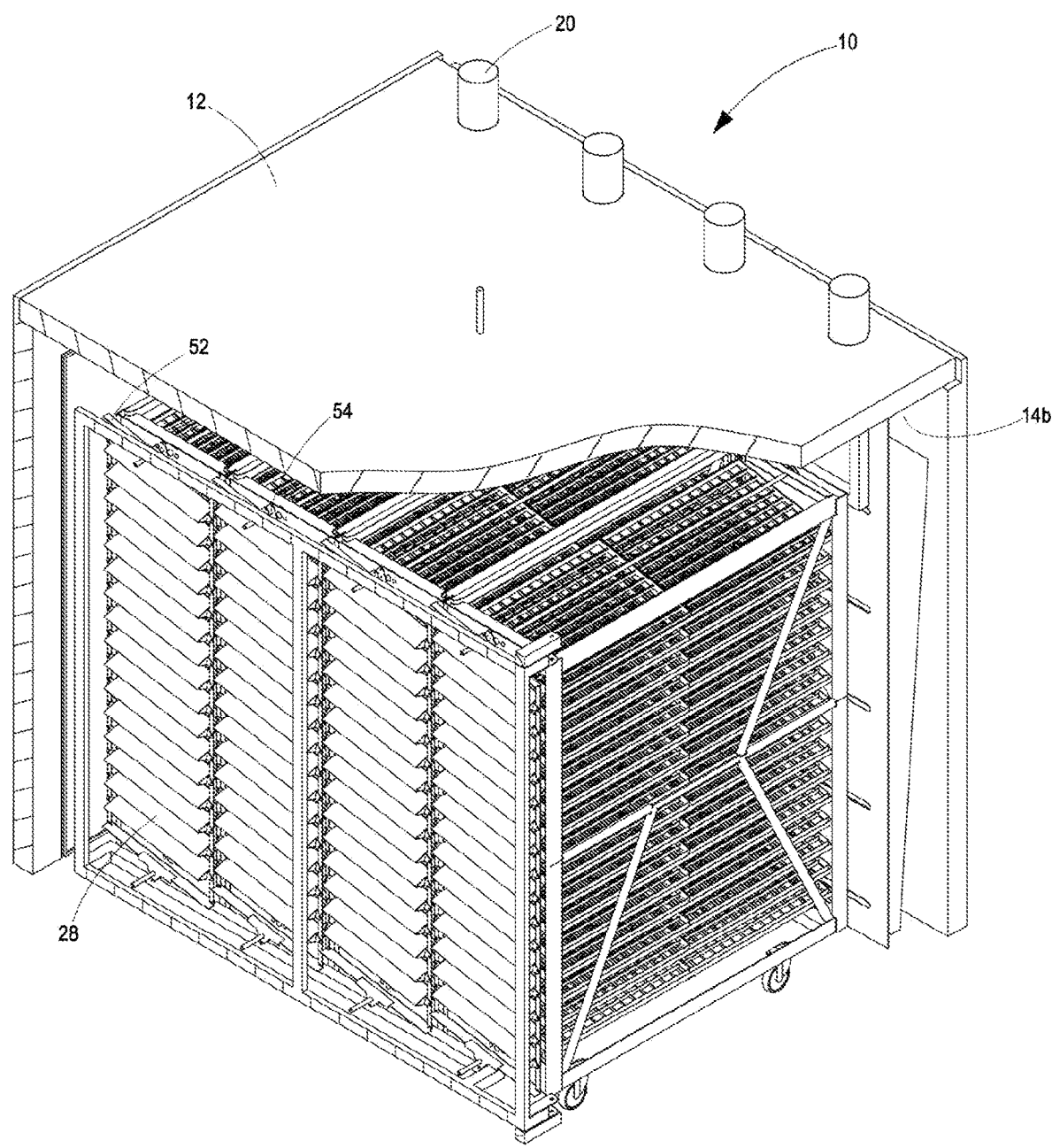
FIG. 4 is a partially cut-away cross-sectional perspective view of the incubator in FIG. 1, with trays tilted in a second direction.
Figure 5:
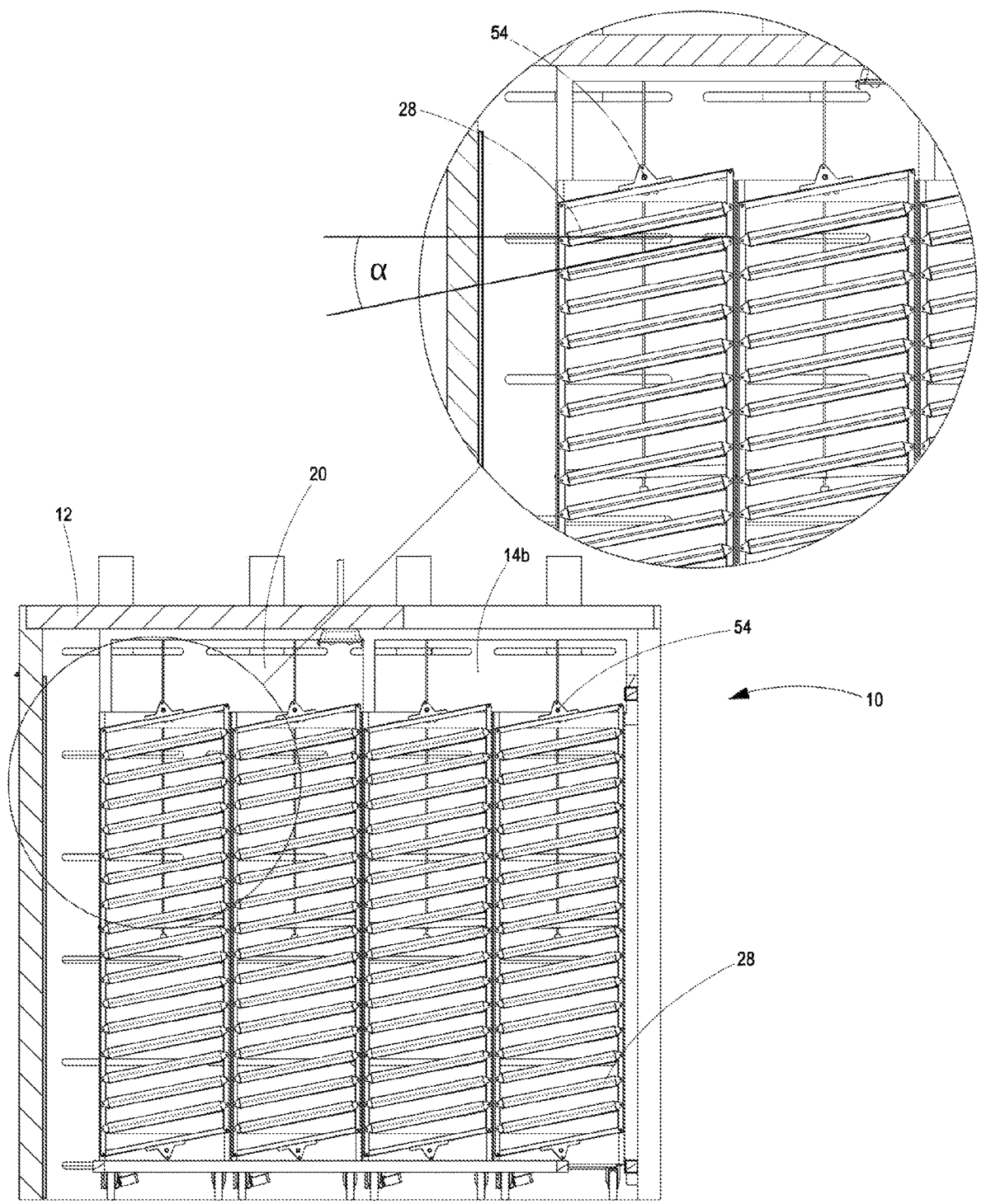
FIG. 5 is a side view of the incubator in FIG. 1, with trays tilted in a first direction.
Figure 6:
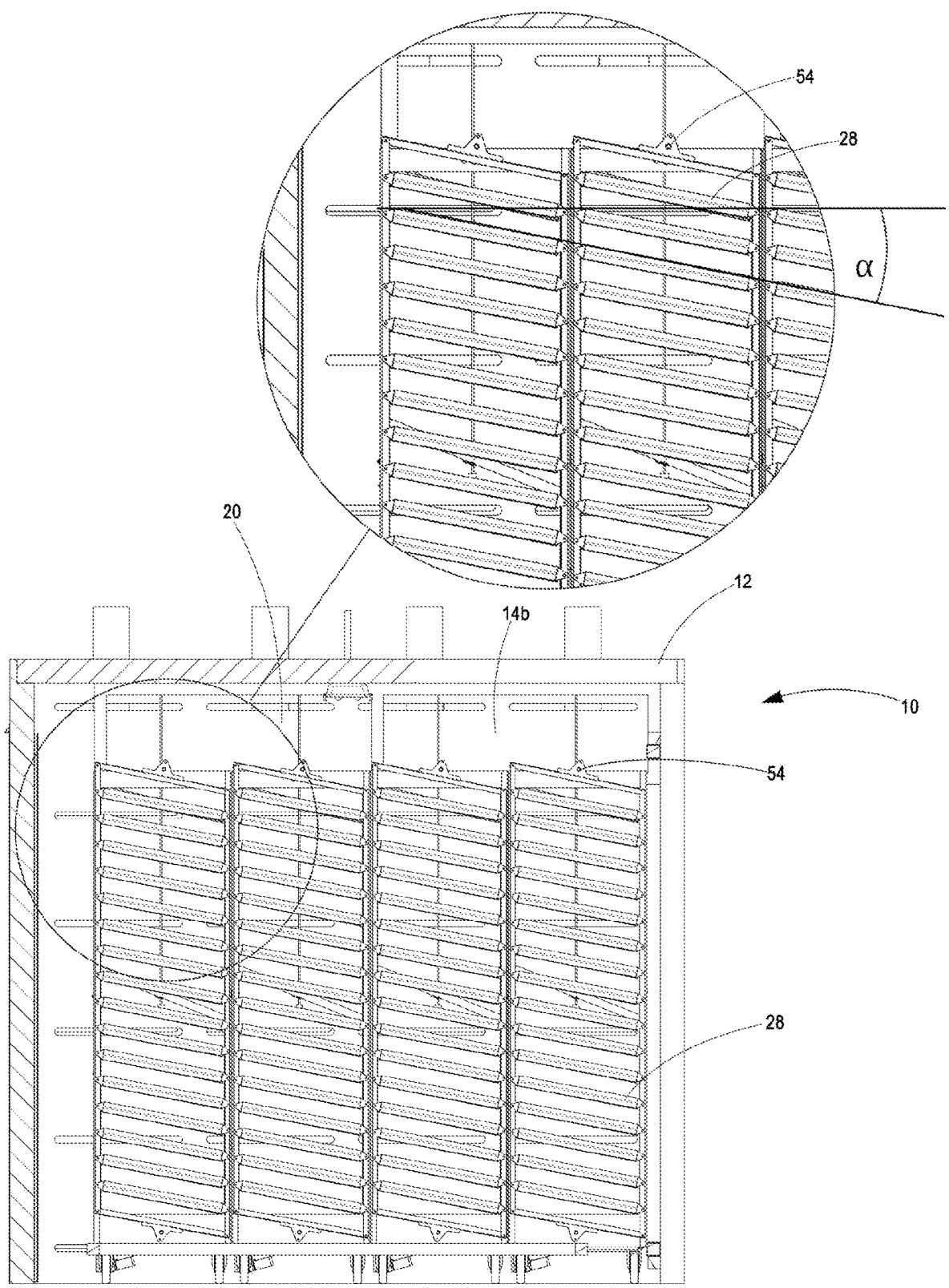
FIG. 6 is a side view of the incubator in FIG. 1, with trays tilted in a second direction.

With reference to FIGS. 1 to 6 of the drawings, an incubator 10 includes a housing 12 defining a chamber 14, an air inlet 16 for introducing air into the chamber 14, first and second air outlets 18 and 20 for extracting air from the chamber 14, a stack of first trays 22, a stack of second trays 24, and first and second deflectors 26 and 28 for dividing the airflow emanating from the air inlet 16 into streams of airflow directed over the first and second trays 22 and 24, respectively.

The housing 12 is generally cuboid, defining a cuboid internal chamber 14. A pair of doors or shutters 30 are associated with housing 12 access openings, regulating access to the chamber 14 from outside the housing 12, and containing air within the chamber 14.

The inlet 16 is located centrally within the chamber 14. Preferably, the inlet 16 extends across the chamber (from operative front to back and from operative top to bottom of the chamber 14), dividing the chamber 14 into two equisized sub-chambers 14a and 14b. The first outlet 18 extends along a first side wall of the housing 12 (from operative front to back and from operative top to bottom of the chamber 14); and the second outlet 20 extends along a second side wall of the housing 12 (opposite the first side wall of the housing 12, and extending from operatively front to back and from operative top to bottom of the chamber 14). Both the first and the second outlets 18 and 20 are spaced from the inlet 16, defining the sub-chambers 14a and 14b there between.

The inlet 16 comprises a plenum defined between a first diffuser 32 adjacent sub-chamber 14a and a second diffuser 34 adjacent sub-chamber 14b. The first outlet 18 similarly comprises a plenum defined between the first side wall of the housing 12 and a third diffuser 36 adjacent sub-chamber 14a. Furthermore, the second outlet 20 similarly comprises a plenum defined between the opposed side wall of the housing 12 and a fourth diffuser 38 adjacent sub-chamber 14b.

Each of the first, second, third and fourth diffusers 32, 34, 36 and 38 define apertures that permit airflow through the diffuser upon pressurisation/depressurisation of the air within the associated plenum. Preferably, but not shown, the apertures defined by each diffuser 32, 34, 36 and 38 is octagonal in shape. Optionally (but now shown), the apertures defined by each of the first, second, third and fourth diffusers 32, 34, 36 and 38 increase in size from the operative upper end of the diffuser to the operative lower end of the diffuser. Further optionally (but not shown), the apertures defined by the third and fourth diffusers 36 and 38 are larger than the corresponding apertures defined by the first and second diffusers 32 and 34. The Figures show the first, second, third and fourth diffusers 32, 34, 36 and 38 extending along parallel planes. Varying the size and spacing of the apertures defined by each of the first to fourth diffusers 32, 34, 36 and 38, facilitates equalisation of airflow across the area of each diffuser (via the apertures defined thereby), and consequently equalises airflow over each tray 22 and 24.

A secondary heating/cooling means 39 regulates temperature of air within the air inlet 16—either heating or cooling such air.

Each of the stacks of first and second trays 22 and 24 comprises a stack of vertically spaced trays 22 or 24, wherein each tray 22 or 24 comprises a generally planar surface defining receptacles 40 (shown as square (but preferably, circular) apertures defined by the trays 22 and 24) for supporting eggs 58 on the trays 22 and 24. The Figures show the first and second trays 22 and 24 supported on first and second trolleys 42 and 44, respectively.

Figure 7:
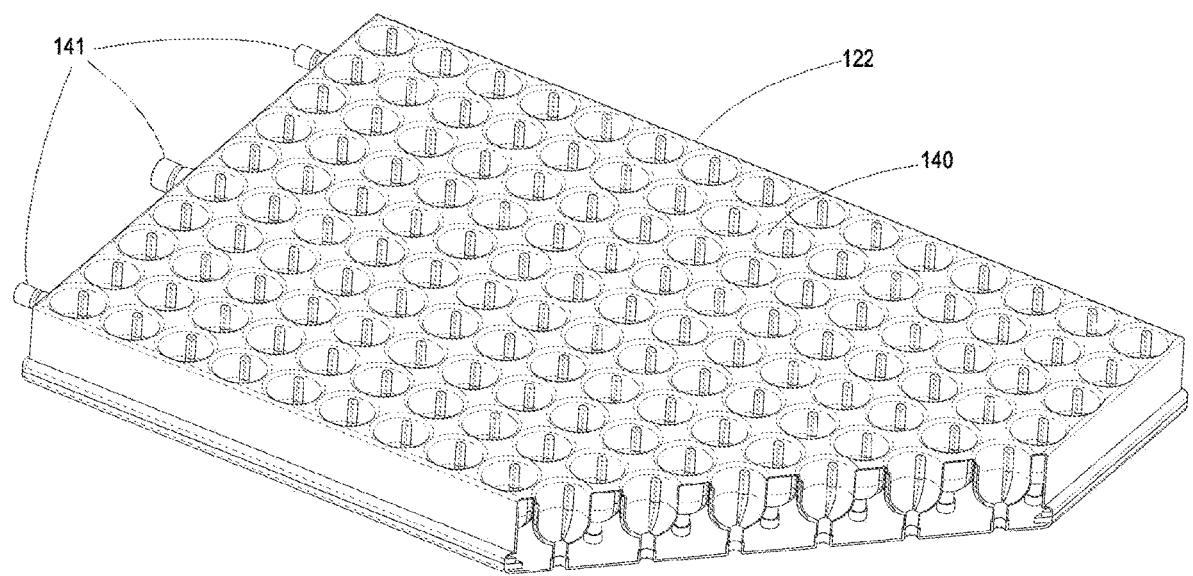
FIG. 7 is a partially cut-away perspective view of an alternative embodiment of the tray for use with the incubator according to FIG. 1.

An alternative embodiment of the tray 122 is shown in FIG. 7. The tray 122 is hollow with inlets and outlets 141, and a fluid reticulation means (not shown) circulates fluid within the tray 122/between each stack of trays (i.e. when the interior of each tray 122 within a stack is in fluid communication with the interior of each of the other trays 122 in the stack). Receptacles 140 are sized and shaped to receive eggs therein. Further optionally, the fluid reticulation means could include primary heating/cooling means (not shown) to regulate the temperature of the first and second trays 122 by heating/cooling fluid reticulated within the trays 122. Temperature, relative humidity and carbon dioxide concentration sensors (not shown) could also incorporated in the tray 122. Preferably, a temperature, relative humidity and carbon dioxide concentration sensor is associated with each receptacle 140, in use to monitor the temperature, relative humidity and carbon dioxide concentration (i.e. egg shell temperature and conditions) of each egg supported in the tray 122 receptacles 140.

Returning to FIGS. 1 to 6, the first trolley 42 includes a first tilting means 46 for tilting the first trays 22 supported thereon on a plane substantially perpendicular to the direction of operative airflow from the aft inlet 16 to the first air outlet 18 by between 38 degrees and 45 degrees (shown as α) on either side of the horizontal.

Similarly, the second trolley 44 includes a third tilting means 48 for tilting the second trays 24 supported thereon on a plane substantially perpendicular to the direction of operative airflow from the aft inlet 16 to the second air outlet 20 by between 38 degrees and 45 degrees (shown as α) on either side of the horizontal.

Each trolley 42 and 44 typically: includes a handle to facilitate pushing/pulling the trolley; and an electrical connector (preferably, on the handle) to electrically connect the trolley to an electrical cable in order to supply the trolley with electrical power and/or to facilitate data transmission.

In use, the first trolley 42 with first trays 22 supported thereon is disposed within sub-chamber 14a (between the air inlet 16 and the first air outlet 18), whereas the second trolley 44 with second trays 24 supported thereon is disposed within sub-chamber 14b (between the air inlet 16 and the second air outlet 20).

The first deflectors 26 are arranged in a stack, operatively spaced from each other, and aligned with the stack of first trays 22. Similarly, the second deflectors 28 are arranged in a stack, operatively spaced from each other, and aligned with the stack of second trays 24.

The first deflectors 26 are disposed between the first trays 22 and the air inlet 16. Each first deflector 26 includes a generally V-shaped portion that tapers: from a first end proximal a first tray 22 with which the first deflector 26 is associated; to the air inlet 16. The first end of each first deflector 26 is sized and shaped to correspond to the inlet-facing side of the associated first tray 22. The Figures further show a generally cuboid portion extending from the first end of each first deflector 26 towards the first tray 22 with which the first deflector 26 is associated. Similarly, the second deflectors 28 are disposed between the second trays 24 and the air inlet 16. Each second deflector 28 includes a generally V-shaped portion that tapers: from a first end proximal a second tray 24 with which the second deflector 28 is associated; to the air inlet 16. The first end of each second deflector 28 is sized and shaped to correspond to the inlet-facing side of the associated second tray 24. The Figures further show a generally cuboid portion extending from the first end of each second deflector 28 towards the second tray 24 with which the second deflector 28 is associated.

Although the Figures show: the first deflectors 26 disposed between the first diffuser 32 and the first trays 22; and the second deflectors 28 disposed between the second diffuser 34 and the second trays 24, it will be appreciated that alternatively: the first deflectors 26 may be disposed upstream of the first diffuser 32 (i.e. between the first and second diffusers 32 and 34, but proximate the first diffuser 32); and the second deflectors 28 may be disposed upstream of the second diffuser 34 (i.e. between the first and second diffusers 32 and 34, but proximate the second diffuser 34). The essence is that the first and second deflectors 26 and 28 are each operatively upstream the first and second trays 22 and 24, respectively. In an alternate embodiment of the invention (not shown), the first and second deflectors 26 and 28 could further alternatively comprise flat rectangular tiltable slats that are sized and shaped to correspond to the size and shape of the inlet-facing side of the associated first and second trays 22 and 24, respectively, which slats merely cover the octagonal apertures defined by the first and second diffusers 32 and 34.

The first deflectors 26 include a second tilting means 50 for tilting the first deflectors 26 on a plane substantially perpendicular to the direction of operative airflow from the air inlet 16 to the first air outlet 18 by between 38 degrees and 45 degrees (shown as α) on either side of the horizontal to maintain alignment of the first deflectors 26 and the first trays 22. Further preferably, the first tilting means 46 that tilts the first trays 22 is coupled to the third tilting means 50 that tilts the first deflectors 26 to synchronise tilting of the first deflectors 26 with tilting of the first trays 22.

Similarly, the second deflectors 28 include a fourth tilting means 52 for tilting the second deflectors 28 on a plane substantially perpendicular to the direction of operative airflow from the air inlet 16 to the second air outlet 20 by between 38 degrees and 45 degrees (shown as α) on either side of the horizontal to maintain alignment of the second deflectors 28 and the second trays 24. Preferably, the third tilting means 48 that tilts the second trays 24 is coupled to the fourth tilting means 52 that tilts the second deflectors 28 to synchronise tilting of the second deflectors 28 with tilting of the second trays 24.

A rocker 54 associated with each of the first and second stacks of deflectors 26 and 28 effects tilting of the deflectors 26 and 28. Although the Figures show the rocker 54 secured to the inlet 16 (or housing 12), it will be appreciated that the rockers 54 (and associated stacks of first and second deflectors 26 and 28) could alternatively be mounted to the trays 22 or 24 (or trolleys 42 and 44), respectively. The position of the deflectors 26 and 28 operatively upstream of the associated trays 22 and 24 is important; not the structure to which the deflectors 26 and 28 are mounted.

A conduit 56 extends: from the first air outlet 18 and the second air outlet 20 on the one hand; to the air inlet 16 on the other hand. Typically, a pump 55 (i.e. a fan) is disposed within the conduit 56 to circulate air: from the first and second air outlets 18 and 20; to the air inlet 16; and via the chamber 14 (between the stacks of trays 22 and 24) back to the first and second air outlets 18 and 20. A filter (not shown) may also be disposed within the conduit 56 to filter solid particles from air conducted along the conduit 56.

In use:
Eggs 58 to be incubated are placed within the receptacles 40 defined by the first and second trays 22 and 24. Typically the eggs 58 are disposed within the receptacles 40 with their air sacs oriented operatively upwards.

The stacks of first and second trays 22 and 24 are placed within the chamber 14 defined by the housing 12—one stack located within a sub-chamber 14*a* and 14*b* on either side of the air inlet 16.

The housing 12 doors 30 are closed to enclose the air within the chamber 14.

The pump 55 is activated to pressurise air within the air inlet 16, and depressurise the air within the first and second air outlets 18 and 20.

The first and second diffusers 32 and 34 equalise the airflow discharged by the air inlet 16 along the area of the first and second diffusers 32 and 34. More particularly, the first diffuser 32 equalises the introduction of air into sub-chamber 14*a* along the height and along the length of the stack of first trays 22; and the second diffuser 34 equalises the introduction of air into sub-chamber 14*b* along the height and along the length of the stack of second trays 24.

The stack of first deflectors 26 divides the airflow emanating from the air inlet 16 (more specifically, the airflow emanating from the first diffuser 32) into streams of airflow that are directed over the set of first trays 22, and the stack of second deflectors 28 divide the airflow emanating from the air inlet 16 (more specifically, the airflow emanating from the second diffuser 34) into streams of airflow that are directed over the set of second trays 24. It will be appreciated that the tapered portion of each of the first deflectors 26 and 28 facilitates division of the airstreams, reducing air turbulence over the eggs 58 supported on the first and second trays 22 and 24.

The first and second air outlets 18 and 20 extract air that has passed over the first and second trays 22 and 24, and conveying the extracted air via the conduit 56, past the filter (not shown) and back to the air inlet 16.

Where fluid is reticulated within the interior of the first and second trays 22 and 24, the temperature of this reticulated fluid may be maintained constant by the primary heating/cooling means (not shown), thereby also maintaining the temperature of the air within the sub-chambers 14*a* and 14*b*. Furthermore, the temperature of the circulated air (in particular, the temperature of air within the air inlet 16) is further regulated by the secondary heating/cooling means 39.

It will be appreciated that the addition of the stacks of first and second deflectors 26 and 28 reduces air turbulence over the first and second trays 22 and 24 which, in turn, facilitates maintenance of uniform temperature across each of the eggs 58 supported on the first and second trays 22 and 24.

Figure 8:
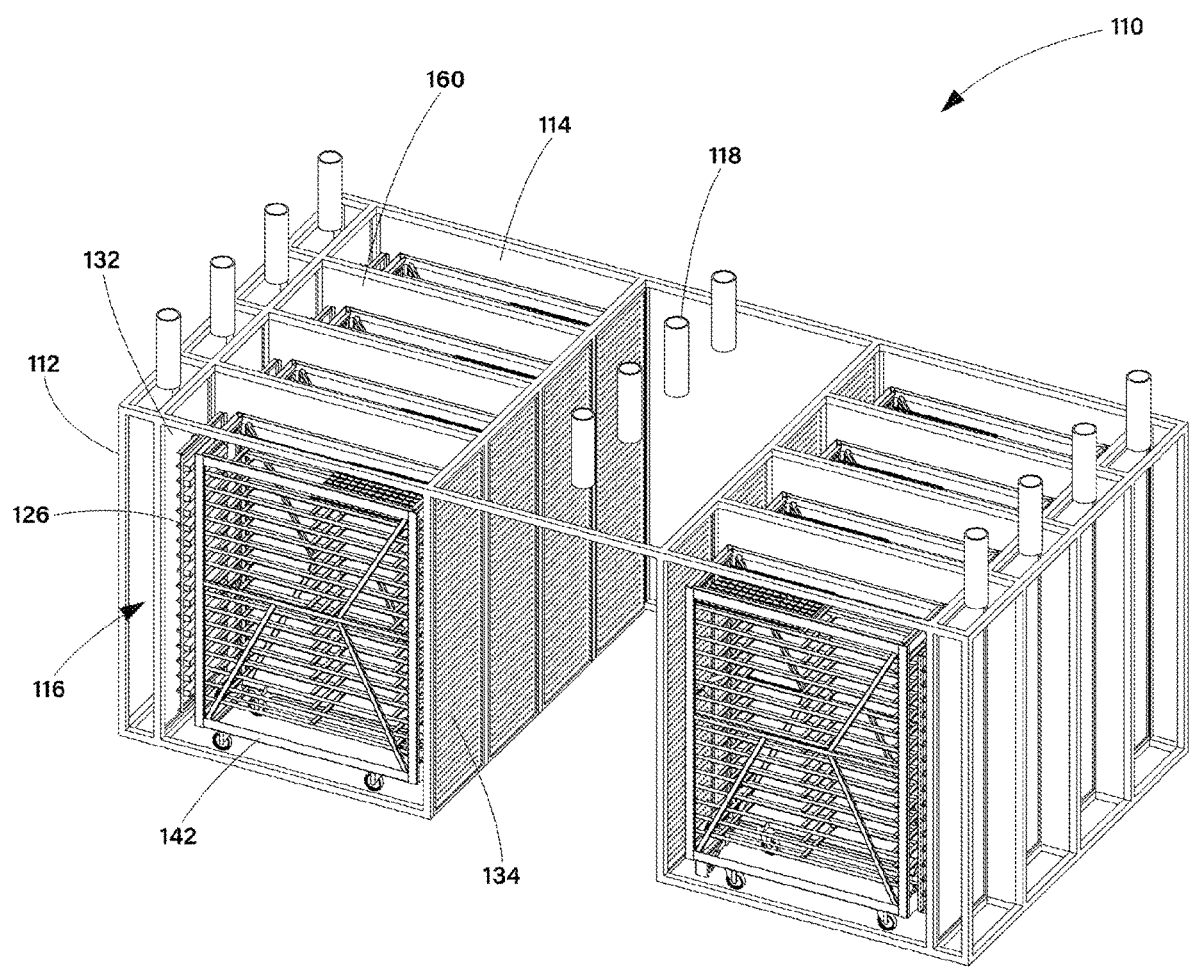
FIG. 8 is a partially cut-away perspective view of an incubator according to an alternative embodiment of the invention.

FIG. 8 shows an incubator 110 according to an alternative embodiment of the invention. This alternative embodiment of the incubator 110 (shown with external wall panels removed for the purpose of showing the interior) differs from the preferred embodiment of the incubator 10 in that:

The air inlets 116 are located along opposing side walls of the housing 112 and the air outlet 118 is located centrally in the housing 112.

The chamber 114 includes partitions 160 that divide the chamber 114 into sub-chambers. Typically, each sub-chamber is sized to receive one trolley 142. By dividing the chamber 114 into sub-chambers: (i) the environment, including temperature of the air, humidity, gas concentrations and airflow velocity, within each sub-chamber can be regulated independently; and (ii) one sub-chamber may be sanitised without affecting incubation and the environment within a neighbouring or any other sub-chamber.

The diffusers 132 associated with the air inlets 116 are disposed operatively upstream of the deflectors 126 associated with the air inlets 116. These air inlet diffusers 132 are specialised panels with apertures that ensure uniform and consistent laminar airflow through the apertures.

The diffusers 134 associated with the air outlet 118 define larger apertures than the apertures defined by the diffusers 132 associated with the air inlets 116.

The diffusers 132 and 134 and the deflectors 126 are hingedly mounted to enable them to rotate relative to the housing 112. This facilitates: access to (and sanitisation of) the air inlet plena, air outlet plenum and deflectors 126.

Each trolley 142 is removable from its sub-chamber by hingedly rotating the corresponding diffuser 134 associated with the air outlet 118, rolling the trolley 142 into the air outlet plenum, and rolling the trolley 142 out of the air outlet plenum through the door that provides access to the air outlet plenum (not shown).

The invention claimed is:

1. An incubator including:
    a housing defining a chamber;
    a pump for introducing air into the chamber through an air inlet;
    a first air outlet for discharging air from the chamber, the first air outlet being spaced from the air inlet;
    a stack of operatively vertically spaced first trays disposed within the chamber, between the air inlet and the first air outlet; and
    a first means for tilting the stack of first trays on a plane substantially perpendicular to the direction of operative airflow from the air inlet to the first air outlet;
    a stack of operatively vertically spaced first deflectors are disposed operatively upstream of the first trays for dividing the airflow from the air inlet to the first air outlet into streams of airflow directed over the first trays; and
    the incubator further includes a second means for tilting the first deflectors on a plane substantially perpendicular to the direction of operative airflow from the air inlet to the first air outlet to align the first deflectors with the first trays, and
    wherein the first tilting means is coupled to the second tilting means to synchronise tilting of the first deflectors with tilting of the first trays.

2. The incubator according to claim 1, wherein each first deflector is generally V-shaped, tapering:
    from a first end proximal a first tray with which the first deflector is associated, which first end of the taper is sized and shaped to correspond to the inlet-facing side of the associated first tray;
    towards the air inlet.

3. The incubator according to claim 2, wherein each first deflector further defines a generally cuboid portion that extends from the first end of the first deflector towards a first tray with which the first deflector is associated.

4. The incubator according to claim 3, wherein the second tilting means includes a rocker to which the first deflectors are connected.

5. The incubator according to claim 4, wherein the air inlet is disposed centrally within the chamber, flanked on a first side by the first air outlet and on an opposite second side by a second air outlet.

6. The incubator according to claim 5, wherein the incubator further includes:
    a stack of operatively vertically spaced second trays disposed within the chamber, between the air inlet and the second air outlet;
    a third means for tilting the stack of second trays on a plane substantially perpendicular to the direction of operative airflow from the air inlet to the second air outlet;
    a stack of operatively vertically spaced second deflectors disposed operatively upstream of the second trays for, in use, dividing the airflow from the air inlet to the second air outlet into streams of airflow directed over the second trays;
    a fourth means for tilting the second deflectors on a plane substantially perpendicular to the direction of operative airflow from the air inlet to the second air outlet, in use to align the second deflectors with the first trays, and wherein the third tilting means is coupled to the fourth tilting means to synchronise tilting of the second deflectors with tilting of the second trays;
    a first conduit extending: from the first air outlet and the second air outlet on the one hand; to the air inlet on the other hand; and
    a filter disposed within the conduit for, in use, filtering air conducted along the conduit,
    wherein the pump, in use, conducts air from the first and second air outlets to the air inlet.

7. The incubator according to claim 6, wherein the first, second, third and fourth means for tilting are, in use, operable to tilt the first trays, the first deflectors, the second trays and the second deflectors, respectively, by between 38 degrees and 45 degrees on either side of the operative horizontal.

8. The incubator according to claim 7, wherein each second deflector is generally V-shaped, tapering:
    from a first end proximal a second tray with which the second deflector is associated, which first end of the taper is sized and shaped to correspond to the inlet-facing side of the associated second tray;
    towards the air inlet.

9. The incubator according to claim 8, wherein each second deflector further defines a generally cuboid portion that extends from the first end of the second deflector towards a second tray with which the second deflector is associated.

10. The incubator according to claim 9, wherein the air inlet includes a plenum with:
    a first diffuser for introducing air into the chamber along the height and along the length of the stack of first trays; and a second diffuser for introducing air along the height and along the length of the stack of second trays.

11. The incubator according to claim 10, wherein:
    the first outlet includes a plenum with a third diffuser for extracting air from the chamber along the height and along the length of the stack of first trays; and
    the second outlet includes a plenum with a fourth diffuser for extracting air from the chamber along the height and along the length of the stack of second trays.

12. The incubator according to claim 11, wherein each of the first, second, third and fourth diffusers comprises a sheet defining a plurality of apertures.

13. The incubator according to claim 12, wherein the apertures defined by each of the third and fourth diffusers are larger than the apertures defined by the first and second diffusers.

14. The incubator according to claim 13, wherein, in respect of each of the first, second, third and fourth diffusers, the apertures defined thereby increase in size from the operative upper end of the diffuser to the operative lower end of the diffuser.

15. The incubator according to claim 14, wherein each of the first and second trays:
    defines a stack of receptacles for, in use, receiving an egg within each receptacle; and
    is hollow.

16. The incubator according to claim 15, wherein the incubator further includes means for reticulating fluid within the first and second trays, in use, to control temperature of the first and second trays.

17. The incubator according to claim 16, wherein the incubator further includes:
    a secondary heating/cooling means for regulating temperature of air within the air inlet; and
    a primary heating/cooling means for regulating temperature of fluid reticulated within the first and second trays.

18. The incubator according to claim 17, wherein: the interior of each of the first trays is in fluid communication with the interior of each of the other first trays; and the interior of each of the second trays is in fluid communication with the interior of each of the other second trays.

19. The incubator according to claim 18, wherein: the stack of first trays are supported on a first trolley; and the stack of second trays are supported on a second trolley.

20. The incubator according to claim 19, wherein the first deflector is disposed:
   between the first diffuser and the first tray; or
   operatively upstream of the first diffuser; and
   the second deflector is disposed:
   between the second diffuser and the second tray; or
   operatively upstream of the second diffuser.

21. The incubator according to claim 20, wherein the apertures defined by each of the first, second, third and fourth diffusers are octagonal in shape.

22. The incubator according to claim 4, wherein the air outlet is disposed centrally within the chamber, flanked on a first side by the first air inlet and on an opposite second side by a second air inlet.

\* \* \* \* \*